United States Patent [19]

Schulz et al.

[11] Patent Number: 4,500,033

[45] Date of Patent: Feb. 19, 1985

[54] METHOD FOR EXPELLING ENTRAPPED AIR FROM REACTIVE METALLIC LAYUPS PRIOR TO DIFFUSION BONDING

[75] Inventors: David W. Schulz, Belmont; Gail E. Spaulding, Redondo Beach, both of Calif.

[73] Assignee: Rockwell International Corporation, El Segundo, Calif.

[21] Appl. No.: 430,570

[22] Filed: Sep. 30, 1982

[51] Int. Cl.$^3$ .................. B23K 35/38; B23K 19/00
[52] U.S. Cl. ................................. 228/219; 228/157; 228/193
[58] Field of Search ............... 228/219, 220, 214, 193, 228/194, 195, 157

[56] References Cited

U.S. PATENT DOCUMENTS

| | | | |
|---|---|---|---|
| 2,561,566 | 7/1951 | Edson et al. | 228/219 |
| 3,468,016 | 9/1969 | Lorain et al. | 228/219 |
| 3,916,506 | 11/1975 | Wolf | 228/122 |
| 3,927,817 | 12/1975 | Hamilton et al. | 228/157 |
| 3,937,387 | 2/1976 | Fletcher et al. | 228/214 |
| 4,324,594 | 4/1982 | Chasteen | 228/206 |

*Primary Examiner*—Kenneth J. Ramsey
*Assistant Examiner*—M. Jordan
*Attorney, Agent, or Firm*—Charles T. Silberberg; Max Geldin

[57] ABSTRACT

In a process for diffusion bonding of at least two metal workpieces of a reactive metal, particularly titanium, the improvement for expelling entrapped air from between surfaces of such workpieces prior to diffusion bonding, which comprises precoating the metal surfaces of the workpieces which are to be diffusion bonded with a substance capable of decomposing at a temperature above about 800° F. and below the diffusion bonding temperature of the workpieces, e.g. of the order about 1300° F., such substance being preferably polytetrafluoroethylene, to form an inert gas having a density greater than air, heating the workpieces to a temperature above about 800° F. and causing decomposition or pyrolysis of such substance and forming an inert gas having a density greater than air, and flushing the inert gas together with the entrapped air out of contact with the surfaces of the workpieces, preferably by means of argon having a density greater than the pyrolysis products or the inert gas. The workpieces are further heated to cause diffusion bonding of the workpieces.

12 Claims, No Drawings

METHOD FOR EXPELLING ENTRAPPED AIR FROM REACTIVE METALLIC LAYUPS PRIOR TO DIFFUSION BONDING

BACKGROUND OF THE INVENTION

This invention relates to the diffusion bonding of reactive metals, such as titanium alloys, and which may be subsequently formed into structures by superplastic forming, and is particularly concerned with the removal of entrapped air from the surfaces of such metallic workpieces prior to diffusion bonding thereof, to prevent reaction of the air with the hot reactive metals prior to diffusion bonding.

A number of alloys exhibit superplasticity and are capable of being subjected to superplastic forming to produce parts of predetermined shapes. Superplasticity is the capability of a material to develop unusually high tensile elongation with reduced tendency toward local necking during deformation. Prior to such superplastic forming, diffusion bonding of the metal workpieces is carried out to bond the workpieces in certain preselected areas, to permit superplastic forming to be carried out in the unbonded areas of the workpieces.

Structures have been successfully produced from a number of titanium-based alloys by the Superplastic Forming/Diffusion Bonding (SPF/DB) process. Such structures are producible because many titanium alloys exhibit the two essential physical properties required for SPF/DB, namely ability to be diffusion bonded and superplasticity.

Diffusion bonding refers to the solid-state, metallurgical joining of surfaces of similar or dissimilar metals by applying heat and pressure for a time duration so as to effect intimate surface contact and cause comingling of atoms at the joint interface.

One category of metals which can be diffusion bonded and which have superplasticity characteristics are termed "reactive" metals. These include alloys of titanium, zirconium, and the refractory metals.

U.S. Pat. No. 3,927,817 discloses a method for fabrication of structures in which metal blanks, preferably of a titanium alloy, are joined at selected areas by diffusion bonding at elevated temperatures and pressures, and then subjected to superplastic forming to form a desired structure. The metal blanks are first treated at selected areas with a stopoff material, such as yttria, boron nitride, graphite, or alumina, to prevent bonding at such treated areas during diffusion bonding. During superplastic forming the metal blanks are expanded at the treated (unbonded) areas into contact with shaping members by increasing the internal pressure, preferably with an inert gas, thus forming an expanded structure of a desired shape, essentially in a single operation.

Thus, after the bonds between adjacent metal blanks are formed during diffusion bonding, inert gas pressure, such as argon or helium, is applied to the interior network to superplastically form the unbonded portions of the adjacent metal sheets.

However, prior to and during diffusion bonding, air (oxygen and nitrogen) will react with hot, reactive metals and alloys such as titanium alloys, resulting in surface contamination which prevents or inhibits the ability to join the metallic workpieces by solid state diffusion bonding.

Diffusion bonding temperatures can vary from 1450° F. to about 1850° F., e.g. about 1700° F. for 6Al-4V titanium alloy, and bonding pressure can vary from about 100 psi to about 2000 psi or more, usually about 150 psi to about 600 psi. If argon is employed to expel air prior to and during diffusion bonding, it has been found that at temperatures from about 800° F. and up to the diffusion bonding temperature, a good diffusion bond is not obtainable.

U.S. Pat. No. 3,937,387 discloses a method of diffusion bonding of aluminum containing components, including a method of preparing aluminum containing surfaces for such welding techniques wherein the aluminum surfaces are freed of any aluminum oxide coating and are coated with a polymeric sealer such as polystyrene which can be thermally removed leaving essentially no residue, the polymeric sealer being removed in a substantially oxygen-free environment and the aluminum components then being brazed or diffusion bonded without the use of a flux to remove oxide coating.

U.S. Pat. No. 3,486,016 discloses a process for producing carbon-free joints preparatory to welding light metal members which are initially coated with a polymer capable of depolymerization such as polybutylene to produce a gaseous monomer at welding temperature and thereafter heating the members to a welding temperature in an atmosphere free of oxygen and finally welding the members while heating in the atmosphere.

U.S. Pat. No. 3,591,917 discloses a method for joining refractory and reactive surfaces to themselves or to other surfaces by depositing a layer of a titanium-indium alloy between the joinable surfaces, and heating under vacuum to evaporate the indium to leave a layer of titanium joining the surfaces.

U.S. Pat. Nos. 3,047,917; 3,821,018 and 3,325,432 are illustrative of a coating employed either as a corrosion-oxidation prevention layer or as a release agent. In this respect polytetrafluoroethylene (TEFLON) is also known for use as a lubricant for tools and dies.

It is an object of the present invention to provide an improved process for removal of any entrapped air from the surfaces of reactive metals prior to diffusion bonding, by means of an inert gas other than nitrogen.

Another object of the invention is the provision of procedure for readily removing entrapped air from the bondline between reactive metal workpieces, particularly titanium alloy workpieces, prior to diffusion bonding, by producing inert gases heavier than air and forcing the air and such inert gases out of such bondline, to produce a diffusion bond of high quality.

A still further object is the provision in the above noted procedure of means for producing such inert gases at temperatures above 800° F., and below the diffusion bonding temperature, such inert gases having a density greater than air, but less than argon, so that a mixture of the entrapped air and such inert gases can be swept away from the contacting surfaces during diffusion bonding by means of argon.

SUMMARY OF THE INVENTION

It has been found according to the concept of the present invention, that if air can be expelled at a relatively low temperature, that is below about 900° F., from the zone of the contacting surfaces of metal workpieces formed of a reactive metal such as a titanium alloy, prior to diffusion bonding thereof, and replaced by an inert gas such as argon, at temperatures above 900° F., and below diffusion bonding temperatures, e.g. about 1300° F., the surfaces to be bonded can be kept free of contamination, and thus can be successfully diffusion bonded.

Thus, according to the invention concept, a gas mixture, such as air, can be removed from a defined volume of space, that is the zone at the bondline of the contacting surfaces, by flushing or levitating it with a gaseous mixture of a higher density, which is generated when the layup of workpieces to be diffusion bonded is heated at temperature above about 800° F. This is accomplished by precoating the metal surface or surfaces of the parts to be diffusion bonded, with a substance that will pyrolyze to form an inert gas having a density greater than air, as the assembly or layup of components or workpieces is heated below the diffusion bonding temperature. As the temperature increases above 900° F., the products of the decomposition or pyrolysis of the coating, in the form of an inert gas, together with entrapped air, can be flushed from the zone of the bondline by flowing argon.

It has been found particularly according to an essential feature of the invention, that the coating employed for the above purpose is polytetrofluoroethylene (PTFE) which can be readily applied to a metallic surface such as a titanium alloy, by spray application of a liquid dispersion of PTFE. The PTFE coating decomposes or pyrolyzes at temperature commencing at about 800° F. to form an inert gas, perfluoroethylene ($C_2F_4$) which has a density substantially greater, about 1.4 times, the density of air. Pyrolysis is complete at about 900° F.

The entrapped air can be expelled by flushing or levitation from the zone of contact between the metal workpieces, prior to reaching a temperature where it can react with the titanium alloy or other reactive metal, and the inert gas produced by such decomposition or pyrolysis of the PTFE coating, together with the entrapped air, can be expelled by the flow of another inert gas, particularly argon, having a density even higher than the inert gas formed by the products of pyrolysis.

Thus, in summary, the invention in its broad aspects resides in a process for diffusion bonding of at least two metal workpieces of a reactive metal, the improvement for expelling entrapped air from between surfaces of said workpieces prior to said diffusion bonding, which comprises:

precoating the metal surfaces of said workpieces which are to be diffusion bonded, with a substance capable of decomposing at a temperature above about 800° F. and below the diffusion bonding temperature of said workpieces, to form pyrolysis products comprising an inert gas having a density greater than air, heating said workpieces to a temperature above about 800° F. and causing decomposition of said substance and forming an inert gas having a density greater than air, flushing said inert gas together with said entrapped air out of contact with the surfaces of said workpieces, below the diffusion bonding temperature of said workpieces, and further heating said workpieces under pressure to cause diffusion bonding of said workpieces, in the absence of entrapped air.

As previously noted, the substance which is particularly effective for generating such inert gas is polytetrofluoroethylene, for reasons set forth in greater detail hereinafter, the decomposition of such substance commencing at about 800° F. and being completed at about 900° F., and argon is employed for carrying out the flushing operation.

DETAILED DESCRIPTION OF THE INVENTION AND PREFERRED EMBODIMENTS

In carrying out the invention procedure, the metal surfaces of the components or workpieces which are to be diffusion bonded are first coated with polytetrofluoroethylene. For this purpose, it is convenient to employ a liquid dispersion of the polytetrofluoroethylene, such as an aqueous dispersion, or a dispersion of the polytetrofluoroethylene in an alcohol or a hydrocarbon, e.g. ethyl alcohol, hexane or toluene, to provide a stable dispersion which can be applied especially by spray application readily to the metal surfaces of the workpieces. Alternatively, a polytetrofluoroethylene film can be applied and adhesively secured to the metal, e.g. titanium alloy, such as Ti-6Al-4V, surfaces to be diffusion bonded.

After application of the polytetrafluoroethylene coating to the reactive metal workpieces, two or more of such workpieces can be laid up in a diffusion bonding and forming apparatus, for purposes of diffusion bonding the metal workpieces together.

As the assembly of metal workpieces is heated to affect diffusion by bonding, at temperatures below 800° F., the polytetrafluoroethylene coating remains stable. However, at temperature of about 800° F. the PTFE coating commences to decompose or pyrolyze to form the inert gas perfluorethylene having a density of about 1.4 times the density of air. As the temperature is gradually increased, pyrolysis of the PTFE coating is essentially complete at 900° F. At temperature between about 900° F. and about 1300° F., usually between about 1000° F. and 1200° F., argon, having a density greater than both air and perfluoroethylene, is introduced into the zone of the bondline between adjacent surfaces of the metal workpieces to be diffusion bonded, as by suitable ducting, and sweeps the mixture of entrapped air and the inert gas formed by the products of the pyrolysis of the polytetrofluoroethylene, out of the assembly of workpieces. It is essential that the argon be introduced at temperature not higher than about 1300° F. for removal of the entrapped air, since air commences to react with titanium alloys to produce contamination products at about 1300° F.

Thus, preferably, at a temperature not higher than about 1300° F., all of the entrapped air, as well as the decomposition or pyrolysis products of the PTFE have been removed from the zone of the bondline between the workpieces to be diffusion bonded, so that at temperature ranging from about 1400° F. to about 1800° F., e.g. about 1700° F. for the above noted titanium alloy, where diffusion bonding occurs, all of the entrapped air has been completely removed from the bonding zones so that no contamination occurs in the diffusion bonded areas of the parts, and the parts can be successfully diffusion bonded.

It was found that if a substance was used as a coating, which decomposes or pyrolyzes at temperatures below 800° F., a good diffusion bond is not obtainable. Further, if argon alone is employed in an effort to remove entrapped air at temperatures above 800° F. and up to the diffusion bonding temperature, it has also been found that a good diffusion bond is not obtained. When selecting a coating material for generating a gas useful for expelling entrapped air from metallic workpieces or layups prior to diffusion bonding, three properties are considered essential, namely (1) stability at temperatures up to 800° F., (2) complete polymer decomposition upon pyrolysis at temperature of about 900° F., and (3) production of pyrolysis products in the form of an inert gas having a density greater than air yet less than that of argon. It was found that among all of the materials considered, polytetrafluoroethylene is most effective in having the above essential characteristics.

Following the diffusion bonding of the metallic, e.g. titanium workpieces, according to the invention procedure, e.g. in certain preselected areas, the diffusion bonded assembly can then be subjected to superplastic forming in unbonded areas of the workpieces, by increasing the internal pressure within the assembly, preferably with an inert gas, while heating at approximately the same temperatures employed for diffusion bonding, i.e. 1650°–1750° F. for Ti-6Al-4V, resulting in stretching of at least one of the sheets at the unbonded areas a predetermined amount depending upon the configuration of the surfaces of the mold, to provide a superplastically formed/diffusion bonded structural part.

The superplastic forming and diffusion bonding operation, and the apparatus for carrying out such procedure, are described in detail in above U.S. Pat. No. 3,927,817. Such disclosure is incorporated herein by reference, but forms no part of the present invention.

The above procedure was employed for diffusion bonding of 6Al-4V titanium alloy (Ti-6Al-4V) blades. For production of such blades, the titanium alloy workpieces were first coated in preselected areas to be diffusion bonded, with a film of PTFE by spraying a liquid dispersion of PTFE on such preselected areas of the parts, removing excess PTFE and drying to form a PTFE coating or film.

A layup of such workpieces or parts was placed in a tool, with the adjacent coated surfaces of the workpieces separated a short distance apart. The tool and the assembly of the workpieces was then heated up to a temperature of 800° F., at which the PTFE coatings on the workpieces commenced to pyrolyze and when the temperature reached about 900° F., pyrolysis of the coatings was substantially complete. At a temperature of about 1100° F. a stream of argon was then passed through suitable ducting into the space between the adjacent surfaces of the parts, sweeping away the inert gas, perfluoroethylene, formed by pyrolysis, and entrapped air, from the space adjacent the surfaces of the workpieces to be diffusion bonded, and as the temperature approached approximately 1300° F., when all the gases had been expelled, the adjacent surfaces of the workpieces were brought into intimate contact, and were diffusion bonded in such preselected areas at temperature of about 1650° F. and at a pressure of about 500 psi.

Following diffusion bonding of several layups or assemblies of workpieces by the procedure described above, the resulting diffusion bonded parts were cut and examined by metallography and showed no contamination from entrapped air in the diffusion bonded areas of the workpieces.

One such diffusion bonded assembly of workpieces was subjected to superplastic forming in unbonded areas following diffusion bonding, by placing the assembly in a forming apparatus and heating the apparatus to temperature of 1650° F. to 1750° F. and applying inert gas pressure between the contacting surfaces of the workpieces to cause superplastic forming of at least one of the workpieces of the assembly by stretching in excess of its original surface area, in relation to an adjacent workpiece, in the unbonded areas between the workpieces, employing the procedure and apparatus as described above in U.S. Pat. No. 3,927,817, to produce successfully a hollow blade-like component.

From the foregoing, it is seen that the invention provides a novel procedure for readily removing air from the surfaces of reactive metals such as titanium alloys, which are to be diffusion bonded, by applying particularly a polytetrafluoroethylene coating to the surfaces of the metal components to be bonded, so that upon heating the assembly, the coating decomposes at a suitable temperature above 800° F., to form an inert gas, perfluoroethylene, heavier than air, and the mixture of entrapped air and such perfluoroethylene can be removed from the surfaces of the parts prior to diffusion bonding, by flushing with argon, thus avoiding reaction of air with the highly reactive metal alloy surfaces, and avoiding contamination in the diffusion bonded areas of the parts.

Since various changes and modification of the invention will occur to and can be made readily by those skilled in the art without departing from the invention concept, the invention is not to be taken as limited except by the scope of the appended claims.

We claim:

1. In a process for diffusion bonding of at least two metal workpieces of a reactive metal selected from the group consisting of alloys of titanium, zirconium and the refractory metals; the improvement for expelling entrapped air from between surfaces of said workpieces prior to said diffusion bonding, which comprises
   precoating the metal surfaces of said workpieces which are to be diffusion bonded, with a substance in the form of an organic polymer capable of decomposing at a temperature above about 800° F. and below the diffusion bonding temperature of said workpieces, to form decomposition products comprising an inert gas having a density greater than air,
   heating said workpieces to a temperature above about 800° F. and below the diffusion bonding temperature of said workpieces, and causing decomposition of said substance and forming a first inert gas atmosphere having a density greater than air,
   flushing said first inert gas atmosphere together with said entrapped air out of contact with the surfaces of said workpieces, by means of a second inert gas having a density greater than the inert gas of said first inert gas atmosphere, at a temperature above the decomposition temperature of said organic polymer and below the diffusion bonding temperature of said workpieces, and
   further heating said workpieces under pressure to cause diffusion bonding of said workpieces, in the absence of entrapped air.

2. The improvement as defined in claim 1, said substance being polytetrafluoroethylene, and capable of undergoing pyrolysis to form the inert gas perfluoroethylene commencing at about 800° F., said pyrolysis being substantially complete at about 900° F.

3. The improvement as defined in claim 1, said second inert gas being argon.

4. The improvement as defined in claim 3, including introducing said argon into the zone adjacent the surfaces of the metal workpieces to be diffusion bonded, when said workpieces have been heated to a temperature above about 900° F., but below the diffusion bonding temperature of said workpieces, to sweep the mixture of entrapped air and perfluoroethylene out of contact with the surfaces of said metal workpieces, prior to said diffusion bonding.

5. The improvement as defined in claim 1, said reactive metal being an alloy of titanium.

6. The improvement as defined in claim 4, said reactive metal being an alloy of titanium.

7. The improvement as defined in claim 6, said argon being introduced into the zone adjacent the surfaces of the metal workpieces to be diffusion bonded, when said workpieces have been heated to a temperature ranging from about 900° F. to about 1300° F., and further heating said workpieces under pressure and in the absence of air at temperature ranging from about 1450° F. to about 1850° F. to cause said diffusion bonding.

8. The improvement as defined in claim 7, said argon being introduced at temperature ranging from about 1000° F. to about 1200° F.

9. In a process for diffusion bonding of at least two metal workpieces of a titanium alloy, the improvement for expelling entrapped air from between the surfaces of said workpieces prior to said diffusion bonding, which comprises coating the surfaces of said titanium workpieces which are to be diffusion bonded with polytetrafluoroethylene, heating said workpieces to a temperature of about 800° F. to cause pyrolysis of said polytetrafluoroethylene coating to form the inert gas perfluoroethylene, continuing heating of said workpieces up to about 900° F. to cause complete pyrolysis of said polytetrafluoroethylene, introducing argon into admixture with said perfluoroethylene gas and said entrapped air at temperature ranging from about 900° F. to about 1300° F., and expelling said perfluoroethylene gas and entrapped air with argon from the zone between the surfaces of said workpieces to be diffusion bonded and replacing said zone with an argon atmosphere, and further heating said workpieces in said argon atmosphere to temperature ranging from about 1450° F. to about 1850° F. to cause diffusion bonding of said workpieces.

10. The improvement as defined in claim 9, said argon being introduced at temperature ranging from about 1000° F. to about 1200° F.

11. In a process for making a structure formed of at least two titanium workpieces of a reactive metal including the steps of diffusion bonding said workpieces in preselected areas while leaving other areas unbonded and applying gas pressure between the contacting surfaces of said at least two metal workpieces to cause superplastic forming of at least one of said workpieces by stretching substantially in excess of its original surface area, in such other unbonded areas; the improvement for expelling entrapped air from between the surfaces of said workpieces in said preselected areas prior to diffusion bonding, which comprises coating the surfaces of said titanium workpieces which are to be diffusion bonded with polytetrafluoroethylene, heating said workpieces to a temperature of about 800° F. to cause pyrolysis of said polytetrafluoroethylene coating to form the inert gas perfluoroethylene, continuing heating of said workpieces up to about 900° F. to cause complete pyrolysis of said polytetrafluoroethylene, introducing argon into admixture with said perfluoroethylene gas and said entrapped air at temperature ranging from about 900° F. to about 1300° F., and expelling said perfluoroethylene gas and entrapped air with argon from the zone between the surfaces of said workpieces to be diffusion bonded and replacing said zone with an argon atmosphere, and further heating said workpieces in said argon atmosphere to temperature ranging from about 1450° F. to about 1850° F. to cause diffusion bonding of said workpieces.

12. The improvement as defined in claim 11, said argon being introduced at temperature ranging from about 1000° F. to about 1200° F.

* * * * *